US011301238B2

(12) United States Patent
Yeh et al.

(10) Patent No.: US 11,301,238 B2
(45) Date of Patent: Apr. 12, 2022

(54) FIRMWARE UPDATING METHOD AND FIRMWARE UPDATING SYSTEM

(71) Applicant: WISTRON NEWEB CORPORATION, Hsinchu (TW)

(72) Inventors: Chen-Yu Yeh, Hsinchu (TW); Chien-Yu Chen, Hsinchu (TW); Wen-Jin Lee, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 0 days.

(21) Appl. No.: 17/017,813

(22) Filed: Sep. 11, 2020

(65) Prior Publication Data

US 2021/0200529 A1 Jul. 1, 2021

(30) Foreign Application Priority Data

Dec. 31, 2019 (TW) ................. 108148490

(51) Int. Cl.
*G06F 8/65* (2018.01)

(52) U.S. Cl.
CPC ..................... *G06F 8/65* (2013.01)

(58) Field of Classification Search
USPC .......................................... 717/171
See application file for complete search history.

(56) References Cited

U.S. PATENT DOCUMENTS

| 7,222,258 | B2* | 5/2007 | Rothman | G06F 8/4436 |
| | | | | 714/6.32 |
| 8,868,924 | B1* | 10/2014 | Filatov | G06F 8/60 |
| | | | | 713/187 |
| 10,001,987 | B2* | 6/2018 | Lin | G06F 8/65 |
| 10,447,483 | B1* | 10/2019 | Su | G06F 8/65 |
| 2003/0131083 | A1* | 7/2003 | Inui | G06F 8/65 |
| | | | | 709/221 |
| 2004/0215755 | A1* | 10/2004 | O'Neill | G06F 8/654 |
| | | | | 709/223 |
| 2008/0098160 | A1* | 4/2008 | Slyz | G06F 8/658 |
| | | | | 711/103 |
| 2011/0167419 | A1* | 7/2011 | Ishikawa | G06F 8/65 |
| | | | | 717/171 |

FOREIGN PATENT DOCUMENTS

| TW | 201617861 A | 5/2016 | |
| WO | WO-2021045723 A1 * | 3/2021 | ............... G06F 8/61 |

OTHER PUBLICATIONS

M. Novak and P. Skryja; "Efficient Partial Firmware Update for IoT Devices with Lua Scripting Interface"; 2019 29th International Conference Radioelektronika (Year: 2019).*

(Continued)

*Primary Examiner* — Wei Y Zhen
*Assistant Examiner* — Clint Thatcher
(74) *Attorney, Agent, or Firm* — McClure, Qualey & Rodack, LLP (57) ABSTRACT

A firmware updating method and a firmware updating system are provided. A host can individually transmit firmware update files to a terminal device, and the host checks by an algorithm whether each of the firmware update files needs to be compressed before each of the firmware update files is transmitted. For the firmware update file that needs to be compressed, the host uses a compression algorithm to reduce a file size of the firmware update file.

18 Claims, 7 Drawing Sheets

(56) References Cited

OTHER PUBLICATIONS

Schofield et al.; "Compressed and Uncompressed Sources—Win32 apps"; Microsoft.com Website [full url in ref.]; 2018 (Year: 2018).*
"What would be faster, transferring a zipped file to flash drive then decompress there or transferring the unzipped files?" Superuser.com website [full url in ref.]; 2017 (Year: 2017).*

* cited by examiner

FIRMWARE UPDATING METHOD AND FIRMWARE UPDATING SYSTEM

CROSS-REFERENCE TO RELATED PATENT APPLICATION

This application claims the benefit of priority to Taiwan Patent Application No. 108148490, filed on Dec. 31, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an updating method and an updating system, and more particularly to a firmware updating method and a firmware updating system.

BACKGROUND OF THE DISCLOSURE

Figure 1:
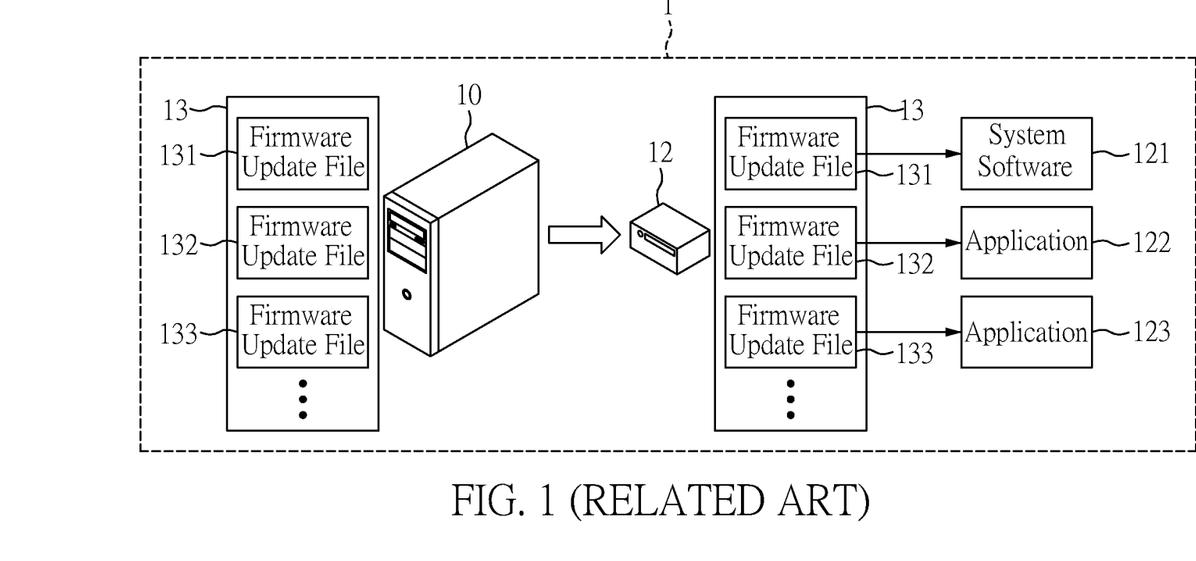
FIG. 1 is a schematic diagram of a traditional firmware updating method.

Generally, a terminal device performs firmware update through a host, and the host packages multiple firmware update files into a large file and transmits it to a terminal device in a traditional firmware updating method. Reference is made to FIG. 1, which is a schematic diagram of the existing firmware updating method. As shown in FIG. 1, each of the firmware update files is used to update a firmware of a terminal device 12. For example, a firmware update file 131 is used to update a system software 121 of the terminal device 12, and firmware update files 132 and 133 are used to update applications 122 and 123 of the terminal device 12, respectively. Therefore, when the terminal device 12 receives a large file 13 packaged and transmitted by a host 10, the terminal device 12 must also separate each of the firmware update files from the large file 13, such that the terminal device 12 can update the corresponding one of the firmware according to each of the firmware update files. However, due to bandwidth limitations of interfaces (e.g., USB or UART, etc.) between the host 10 and the terminal device 12, it will take more time to transfer the large file 13 and cause the terminal device 12 to spend too much time updating the firmwares. Therefore, how the terminal device 12 can complete the firmware update faster has become an important issue in the arts.

SUMMARY OF THE DISCLOSURE

In response to the above-referenced technical inadequacies, the present disclosure provides a firmware updating method and a firmware updating system. In one aspect, the present disclosure provides a firmware updating method executed in a firmware updating system, and the firmware updating system includes a host and a terminal device. The host stores a plurality of firmware update files for respectively updating a plurality of firmwares of the terminal device, and the firmware updating method includes the following steps: configuring the host to determine whether or not a Kth firmware update file of the plurality of firmware update file needs to be compressed by executing an algorithm, where K is a positive integer; in response to determining that the Kth firmware update file needs to be compressed, configuring the host to compress the Kth firmware update file by executing a compression algorithm and transmit the compressed Kth firmware update file to the terminal device; in response to determining that the Kth firmware update file does not need to be compressed, configuring the host to transmit the original Kth firmware update file to the terminal device; and configuring, for the compressed Kth firmware update file, the terminal device to decompress the compressed Kth firmware update file by using the compression algorithm, and update a corresponding one of the plurality of firmwares by using the decompressed Kth firmware update file, and configuring, for the original Kth firmware, the terminal device to use the original Kth firmware update file to update the corresponding one of the plurality of firmwares.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2A:
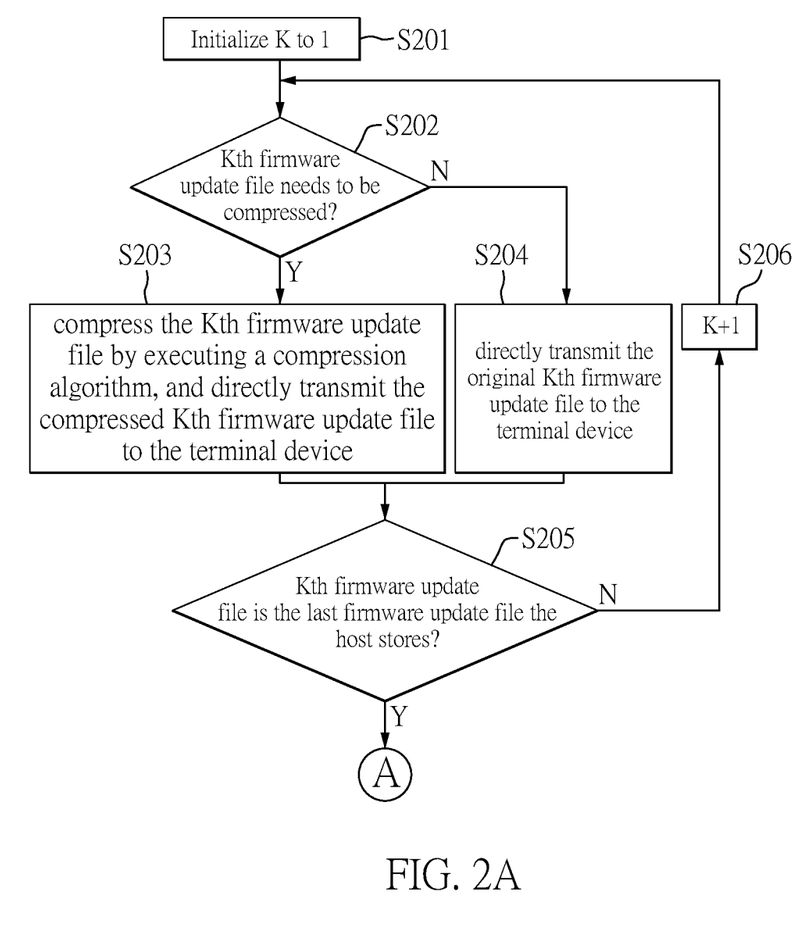
FIGS. 2A and 2B are flowcharts of a firmware updating method according to one embodiment of the present disclosure.
Figure 2B:
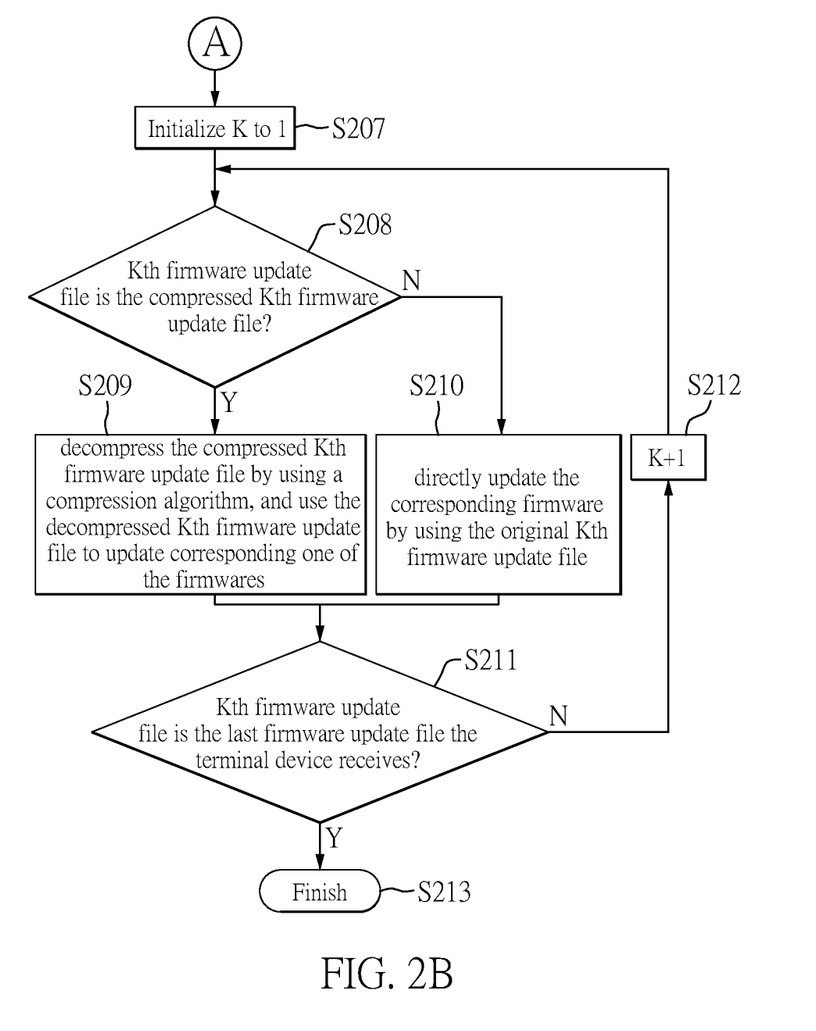
Figure 3:
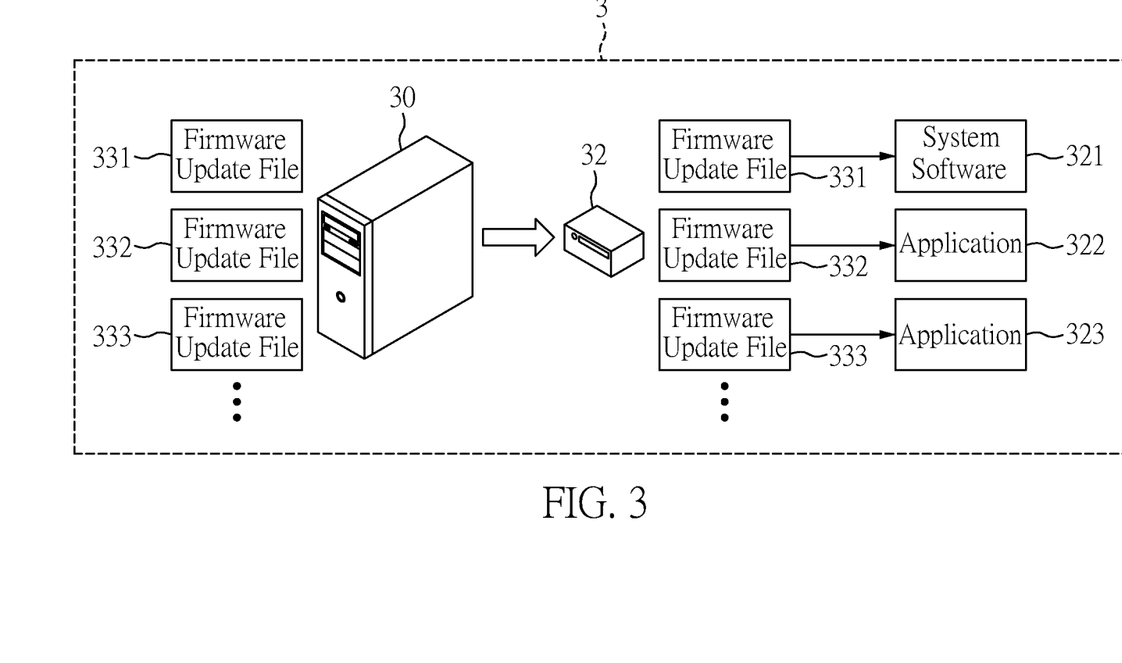
FIG. 3 is a block diagram of a firmware update system provided by one embodiment of the present disclosure.

Reference is made to FIGS. 2A, 2B, and 3, FIGS. 2A and 2B are flowcharts of a firmware updating method according to one embodiment of the present disclosure, and FIG. 3 is a block diagram of a firmware update system provided by one embodiment of the present disclosure. It should be noted that the firmware updating method of FIGS. 2A and 2B can be executed in the firmware updating system 3 of FIG. 3, but the present disclosure does not limit the firmware updating method of FIGS. 2A and 2B to be only executable in the firmware updating system 3 of FIG. 3. As shown in FIG. 3, the firmware update system 3 includes a host 30 and a terminal device 32. The host 30 stores a plurality of firmware update files, and each of the firmware update files is used to update one firmware of the terminal device 32. For example, a firmware update file 331 is used to update a system software 321 of the terminal device 32, and firmware update files 332 and 333 are used to update applications 322 and 323 of the terminal device 32. In summary, the present disclosure does not limit the number of firmware update files stored in the host 30.

In the present embodiment, for each of the firmware update files, or a Kth firmware update file, where K is a positive integer, the host 30 determines whether the Kth firmware update file needs to be compressed by executing an algorithm. In response to determining that the Kth firmware update file needs to be compressed, the host 30 is configured to compress the Kth firmware update file by executing a compression algorithm, and directly transmit the compressed Kth firmware update file to the terminal device 32. In response to determining that the Kth firmware update file does not need to be compressed, the host 30 is configured to directly transmit the original Kth firmware update file to the terminal device 32. Therefore, as shown in FIG. 2A, in step S201, the host 30 can firstly initialize a variable K to one, and in step S202, the host 30 determines whether the Kth firmware update file needs to be compressed by executing the algorithm. If the host 30 determines that the Kth firmware update file needs to be compressed, the host 30 performs step S203 to compress the Kth firmware update file by executing the compression algorithm, and directly transmit the compressed Kth firmware update file to the terminal device 32. If the host 30 determines that the Kth firmware update file does not need to be compressed, the host 30 performs step S204 to directly transmit the original Kth firmware update file to the terminal device 32.

Next, in step S205, the host 30 determines whether the Kth firmware update file is the last firmware update file the host 30 stores. If the host 30 determines that the Kth firmware update file is not the last firmware update file the host 30 stores, the host 30 then performs step S206 to increase the variable K by one and returns to step S202 after K is increased by one. If the host 30 determines that the Kth firmware update file is the last firmware update file the host 30 stores, the method proceeds to step S207. That is, compared to the host 10 in FIG. 1, the host 30 in the present embodiment individually transmits the firmware update files to the terminal device 32, and before transmitting each of the firmware update files, the host 30 checks whether each of the firmware update files needs to be compressed. For the firmware update file that needs to be compressed, the host 30 uses the compression algorithm to reduce a file size of the firmware update file, so as to reduce a transmission time for transmitting the firmware update file to the terminal device 32. For example, according to existing compression algorithms, such as ZIP, Lempel-Ziv-Markov chain algorithm (LZMA), or RAR, a compression rate of the firmware update file can be as small as 10% of the original file size. In short, considering a computing capability of a processor and a size of a memory of the terminal device 32, the host 30 in this embodiment uses LZMA to reduce the file size of the firmware update file, but the present disclosure is not limited thereto.

In addition, the host 30 does not need to package all the firmware update files into a large file since the firmware update files can be individually transmitted to the terminal device 32, and therefore this embodiment further saves file separation time on the terminal device 32. That is, in this embodiment, tasks of separating each of the firmware update files can be regarded as being performed by the host 30 instead of the terminal device 32, and the tasks only need to be performed on the host 30 once. Therefore, if a firmware update system 3 includes other terminal devices, and the other terminal devices also perform firmware updates through the host 30 in sequence, this embodiment can save more time for firmware updating on the firmware update system 3. It should be noted that the computing capability of the processor of the host 30 is stronger than the computing capability of the processor of the terminal device 32. As for the algorithm of step S202, which will be explained in detail with other examples in the following, thus details thereof will not be iterated here.

It should be noted that since operation principles of compressing files using the compression algorithm are known to those skilled in the arts, details of step S203 will not be further described, and the present disclosure does not limit a specific implementation of the host 30 in determining whether the Kth firmware update file is the last firmware update file that the host 30 stores and those skilled in the arts should be able to make related designs based on actual needs or applications. Next, as shown in FIG. 2B, in step S207, that the terminal device 32 receives the firmware update files, the terminal device 32 can firstly initialize the variable K as 1, and in step S208, the terminal device 32 checks whether the received Kth firmware update file is the compressed Kth firmware update file. If the terminal device 32 checks that the received Kth firmware update file is the compressed Kth firmware update file, the terminal device 32 executes step S209 to decompress the compressed Kth firmware update file by using the compression algorithm, and uses the decompressed Kth firmware update file to update corresponding one of the firmwares. If the terminal device 32 checks that the received Kth firmware update file is not the compressed Kth firmware update file, the terminal device 32 executes step S210 to directly update the corresponding firmware by using the original Kth firmware update file. Correspondingly, in step S211, the terminal device 32 determines whether the Kth firmware update file is the last firmware update file the terminal device 32 receives. If the terminal device 32 determines the Kth firmware update file is not the last firmware update file the terminal device 32 receives, the terminal device 32 executes step S212 to increase the variable K by one and returns to step S208 after K is increased by one. If the terminal device 32 determines the Kth firmware update file is the last firmware update file the terminal device 32 receives, the firmware update system 3 proceeds to step S213 to end the firmware updating procedure.

In order to facilitate the following description, the present embodiment takes an example using the firmware update file 331 as a first firmware update file (i.e., K=1) of these firmware update files and the firmware update file 332 as the second firmware update file (i.e., K=2) of these firmware update files for illustration, but the example is not intended to limit the present disclosure. Therefore, when the host 30 determines that the first firmware update file 331 needs to be compressed through the algorithm, the host 30 uses the compression algorithm to compress the first firmware update file 331 and directly transmits the compressed first firmware update file 331 to the terminal device 32. When the host 30 determines that the second firmware update file 332 does not need to be compressed through the algorithm, the host 30 directly transmits the original second firmware update file 332 to the terminal device 32. Correspondingly, after the terminal device 32 receives these firmware update files, for the compressed first firmware update file 331, the terminal device 32 can decompress the compressed first firmware update file 331 by using the compression algorithm, and use the decompressed first firmware update file 331 to update the system software 321. For the original second firmware update file 332, the terminal device 32 directly uses the original second firmware update file 332 to update the application 322.

It should be further noted that the present disclosure does not limit a specific implementation of the terminal device 32 in checking whether the Kth firmware update file is the compressed Kth firmware update file and in determining whether the Kth firmware update file is the last firmware update file the terminal device 32 receives, and those skilled in the arts should be able to make related designs based on actual needs or applications. In this embodiment, for the Kth firmware update file of these firmware update files, the algorithm of step S202 can be executed to determine whether $Tt_{CF}+Td_{CF}$ is less than $Tt_{OF}$, where $Tt_{CF}$ is a transmission time for transmitting the compressed Kth firmware update file to the terminal device 32, $Td_{CF}$ is a decompression time of the compressed Kth firmware update file, and $Tt_{OF}$ is a transmission time for transmitting the original Kth firmware update file to the terminal device 32. That is, the purpose of compressing the Kth firmware update file by the host 30 is to reduce the transmission time for transmitting the Kth firmware update file to the terminal device 32. Therefore, when $Tt_{CF}+Td_{CF}$ is less than $Tt_{OF}$, the host 30 determines that the Kth firmware update file needs to be compressed, and when $Tt_{CF}+Td_{CF}$ is not less than $Tt_{OF}$, the host 30 determines that the Kth firmware update file does not need to be compressed.

In practice, $Tt_{OF}$ is equal to the file size of the original Kth firmware update file divided by a data transmission rate between the host 30 and the terminal device 32. In this embodiment, the data transmission rate between the host 30 and the terminal device 32 may be referred to as Tr for short, and the file size of the original Kth firmware update file is referred to as $Size_{OF}$ for short, and thus the above definition can be expressed as equation (1): $(Tt_{OF})=(Size_{OF}/Tr)$. Correspondingly, $Tt_{CF}$ is equal to the file size of the compressed Kth firmware update file divided by the data transmission rate between the host 30 and the terminal device 32. In this embodiment, the file size of the compressed Kth firmware update file can be referred to as $Size_{CF}$ for short, so that the above definition can also be expressed as equation (2): $(Tt_{CF})=(Size_{CF}/Tr)$. In addition, $Td_{CF}$ is equal to the file size of the compressed Kth firmware update file divided by a decompression speed of the terminal device 32. In this embodiment, the decompression speed of the terminal device 32 can be referred to as Ds for short, and thus the above definition can also be expressed as equation (3): $(Td_{CF})=(Size_{CF}/Ds)$.

It can be observed that if the data transfer rate between the host 30 and the terminal device 32 is 175 kbps, the decompression speed of the terminal device 32 is 260 kbps, the file size of the original first firmware update file 331 is 22 MB, and the file size of the compressed first firmware update file 331 is 10 MB, the host 30 can obtain that, according to the above equations (1) to (3), the transmission time for transmitting the original firmware update file 331 to the terminal device 32 is about 129 seconds, the transmission time for transmitting the compressed first firmware update file 331 to the terminal device 32 is about 59 seconds, and the decompression time for decompressing the compressed first firmware update file 331 is about 40 seconds. That is, in step S202 of K=1, since $Tt_{CF}+Td_{CF}$ is smaller than $Tt_{OF}$, the host 30 can determine that the first firmware update file 331 needs to be compressed. Based on the above example, this embodiment saves almost 30 seconds of transmission time.

It should be understood that the decompression speed of the terminal device 32 is determined according to the computing capability of the processor and the size of the memory of the terminal device 32. For example, the worse the computing capability of the processor and the smaller the memory size, the lower the decompression speed of the terminal device 32 has. However, in order to enable the terminal device 32 to have a higher decompression speed, the present disclosure further provides some improved mechanisms on the terminal device 32. The details of the improved mechanisms will be explained in detail hereinafter with other drawings, and are omitted here. In a word, the aforementioned decompression speed can be obtained through experiments, but the present disclosure is not limited thereto, and the present disclosure does not limit specific implementations for the host 30 to obtain parameters such as data transmission rate, decompression speed, and file size. Therefore, those skilled in the arts should be able to design according to actual needs or applications.

Furthermore, in addition to the computing capability and memory size of the processor of the terminal device 32, the decompression speed of the terminal device 32 can be determined based on a dictionary size of the compression algorithm, and the dictionary size can also be determined based on the memory size of the terminal device 32. For example, higher dictionary size may lead to higher decompression speeds, but also consumes more memory size. Therefore, due to a limitation of the memory size on the terminal device 32, especially the size of volatile memory on the terminal device 32, such as the size of random access memory (RAM), the present embodiment sets the dictionary size of the compression algorithm, such as LZMA, to 14, but the present disclosure is not limited thereto.

Figure 4:
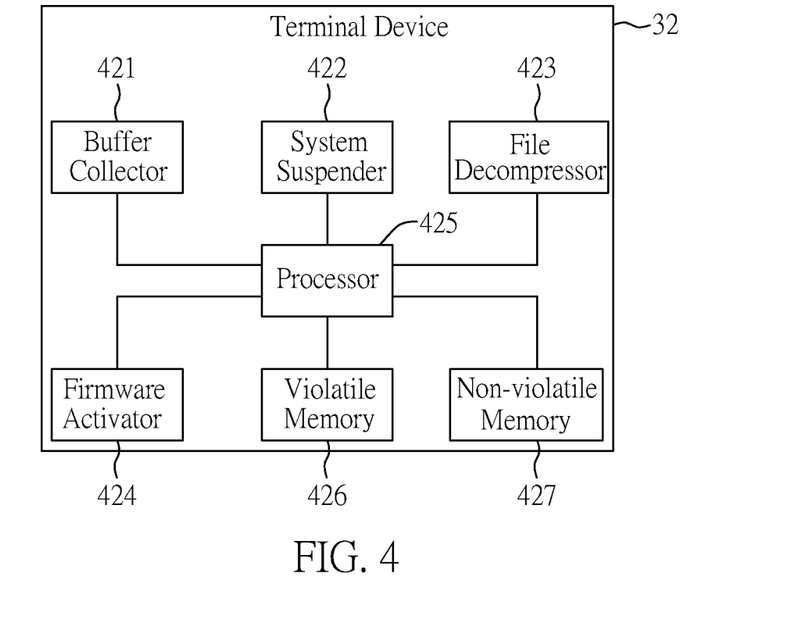
FIG. 4 is a block diagram of a terminal device in the firmware updating system of FIG. 3.
Figure 5:
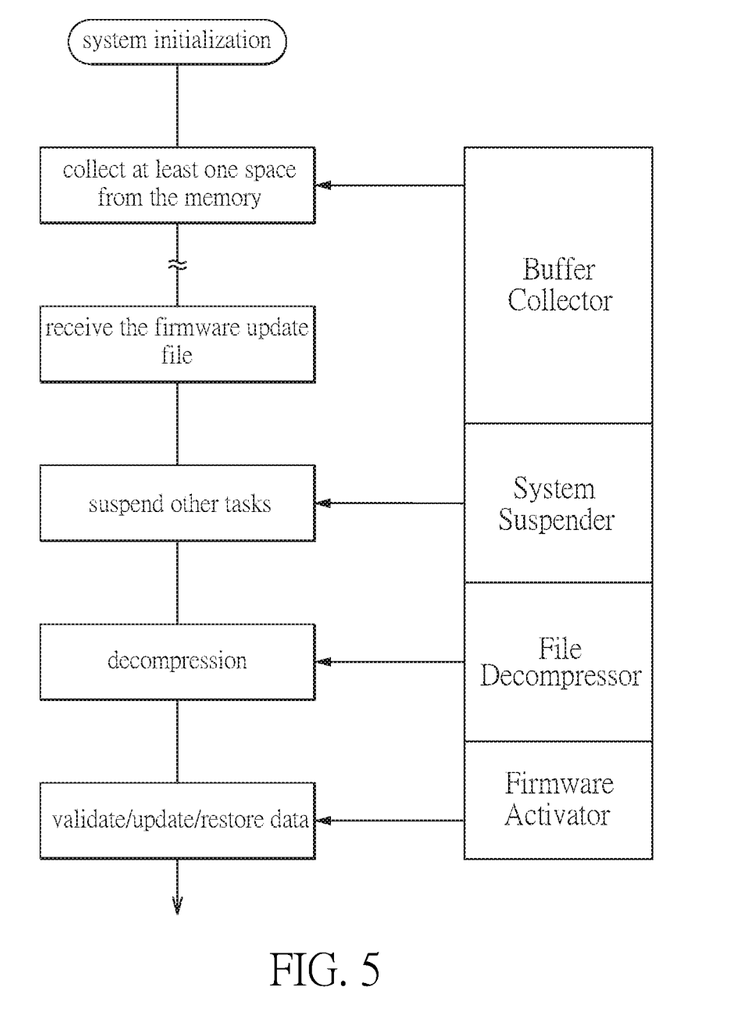
FIG. 5 is a sequence schematic diagram of a firmware updating method performed by each component in the terminal device of FIG. 4.

On the other hand, reference is made to FIGS. 4 and 5. FIG. 4 is a block diagram of the terminal device 32 in the firmware updating system of FIG. 3, and FIG. 5 is a sequence schematic diagram of a firmware updating method performed by each component in the terminal device 32. As shown in FIG. 4, the terminal device 32 can include a buffer collector 421, a system suspender 422, a file decompressor 423, and a firmware activator 424. It should be noted that the above components can be implemented by software, or by hardware with firmware or software, but the present disclosure is not limited thereto. In addition, the above components may be integrated or separated, but the present disclosure is not limited thereto. It should be noted again that if the above components are software, each component is stored in non-volatile memory and each component is executed by the processor of the terminal device 32 to realize the function of each component. Therefore, as shown in FIG. 4, the terminal device 32 can further include a processor 425, a volatile memory 426, and a non-volatile memory 427.

As mentioned above, the size of the memory on the terminal device 32, especially the size of the volatile memory 426 on the terminal device 32, is most likely to seriously affect the decompression speed. Therefore, as shown in FIG. 5, during a system initialization of the terminal device 32, the terminal device 32 can use the buffer collector 421 to collect at least one space from the volatile memory 426 of the terminal device 32, such as RANI, and after the system initialization is completed, the at least one space is used as a buffer for decompression. That is, the buffer collector 421 is used to collect memory space reserved and used during an operation of the terminal device 32. In practice, the buffer collector 421 attempts to collect a preset size of memory space, for example, two $2^{14}$ Bytes, which are used as input memory and output memory during decompression, of which 14 is a set value of dictionary size. In other embodiments, the memory space of the preset size may also be two $2^{14}$ bytes plus a fixed size byte, but the present disclosure is not limited thereto. Therefore, after the buffer collector 421 collects the space from the volatile memory 426 to meet the preset size, the buffer collector 421 stops collecting the space from the volatile memory 426. If the size of the volatile memory 426 cannot meet the preset size, the buffer collector 421 uses all the collected memory space as the buffer for decompression. In a word, the preset size can be determined according to the compression algorithm, such as LZMA, but the present disclosure is not limited thereto, and the present disclosure does not limit specific implementations for the buffer collector 421 to collect the space from the volatile memory 426, as those skilled in the arts should able to design according to actual needs or applications.

Figure 6:
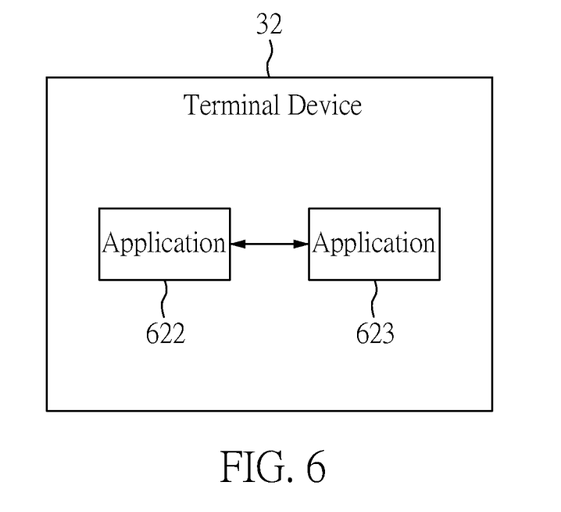
FIG. 6 is a schematic diagram of a system initialization performed by the terminal device of FIG. 4.

For example, reference is made to FIG. 6, which is a schematic diagram of a system initialization performed by the terminal device 32 of FIG. 4. During the system initialization of the terminal device 32, message transceiving of the terminal device 32 can include enabling the application 622 and the application 623 to be able to access resources and coordinate with each other, and the two applications use the inter-process communication (IPC) technology to transmit data or signals. Therefore, the volatile memory 426 here stores messages transmitted from the application 622 to the application 623 and messages transmitted from the application 623 to the application 622. In this embodiment, these two types of messages can be referred to as data 1 and data 2, and the data 1 and data 2 are stored in the volatile memory 426. For example, there will be corresponding memory addresses and sizes in the RAM. Therefore, the buffer collector 421 collecting the at least one space from the volatile memory 426 refers to collecting memory addresses and sizes of the volatile memory 426. It should be noted that the applications 622 and 623 can refer to other applications on the terminal device 32, but the present disclosure does not limit specific functions and contents of the applications 622 and 623.

In addition, the file decompressor 423 is used to decompress the compressed Kth firmware update file to obtain the decompressed Kth firmware update file. Since these memory spaces collected by the buffer collector 421 will be used by the file decompressor 423 during decompression, therefore the terminal device 32 does not allow other components to use these memory spaces during decompression, otherwise, the volatile memory 426 on the terminal device 32 will be in a state of confusion. It can be observed that the system suspender 422 is designed to suspend other tasks of the terminal device 32, such that the processor 425 of the terminal device 32 will not be occupied by other tasks, and these memory spaces will not be overwritten by data of other tasks. Correspondingly, the system suspender 422 can write the data of the volatile memory 426, such as the data 1 and the data 2 in the RANI, into the non-volatile memory 427, such as flash memory, to prevent data 1 and data 2 from being lost during decompression and firmware updating. As shown in FIG. 5, it should be noted that the host 30 sends a firmware download instruction to the terminal device 32, such that the terminal device 32 performs a download operation. After the download operation is completed, the host 30 sends a firmware activation instruction to the terminal device 32. At this time, the system suspender 422 starts execution. In other words, when the terminal device 32 receives these firmware update files, the system suspender 422 will first suspend executions of other tasks, and then write the data of the volatile memory 426, such as the data 1 and the data 2 in the RAM, to the non-volatile memory 427, thereby freeing up the memory space, and the file decompressor 423 starts decompressing the compressed firmware update files afterward. After the terminal device 32 uses these firmware update files to update the firmwares, the system suspender 422 can then resume the executions of other tasks.

It should be understood that the firmware update files received by the terminal device 32 will firstly be stored in the non-volatile memory 427, and when the received Kth firmware update file is the compressed Kth firmware update file, the operation flow of the file decompressor 423 can include the following steps. First, the compressed Kth firmware update file is written from the non-volatile memory 427 to the aforementioned input memory during decompression, that is, one of the $2^{14}$ bytes collected by the buffer collector 421 from the volatile memory 426, and then the compressed Kth firmware update file written to this input memory is decompressed. Then, the decompressed Kth firmware update file is written to the aforementioned output memory during decompression, that is, another 214 byte collected by the buffer collector 421 from the volatile memory 426, and the decompressed Kth firmware update file written in the output memory is stored in the non-volatile memory 427. Finally, as shown in FIG. 5, the firmware activator 424 starts to validate these firmware update files, and this step is to check the integrity of the firmware update files. In addition, the firmware activator 424 also starts to use these firmware update files to update the firmware, and rewrites the data 1 and the data 2 written in the non-volatile memory 427 back to the volatile memory 426 of the terminal device 32, or in other words, restore the data so that the system suspender 422 can resume the executions of other tasks.

In conclusion, a firmware updating method and a firmware updating system provided by the present disclosure can individually transmit firmware update files to a terminal device by a host, and the host checks by an algorithm whether each of the firmware update files needs to be compressed before each of the firmware update files is transmitted. For the firmware update file that needs to be compressed, the host uses a compression algorithm to reduce a file size of the firmware update file, thereby reducing a transmission time for transmitting the firmware update file to the terminal device. In addition, in order to enable the terminal device to have a higher decompression speed, the present disclosure further provides some improved mechanisms on the terminal device. For example, a buffer collector can be used to collect memory space reserved and used during the operation of the terminal device, as a buffer during decompression, and the executions of other tasks are suspended by a system suspender, such that a processor of the terminal device is not occupied by the other tasks, and the memory space can be prevented from being overwritten by data of the other tasks.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A firmware updating method executed in a firmware updating system, the firmware updating system including a host and a terminal device, the host storing a plurality of firmware update files for respectively updating a plurality of firmwares of the terminal device, the firmware updating method comprising:
   configuring the host to individually transmit the plurality of firmware update files to the terminal device and determine whether or not a Kth firmware update file of the plurality of firmware update files needs to be compressed by executing an algorithm before transmitting the Kth firmware update file, wherein K is a positive integer;
   in response to determining that the Kth firmware update file needs to be compressed, configuring the host to compress the Kth firmware update file by executing a compression algorithm and transmit the compressed Kth firmware update file to the terminal device;
   in response to determining that the Kth firmware update file does not need to be compressed, configuring the host to transmit the original Kth firmware update file to the terminal device; and
   configuring, for the compressed Kth firmware update file, the terminal device to decompress the compressed Kth firmware update file by using the compression algorithm, and update a corresponding one of the plurality of firmwares by using the decompressed Kth firmware update file, and configuring, for the original Kth firmware update file, the terminal device to use the original Kth firmware update file to update the corresponding one of the plurality of firmwares.

2. The firmware updating method according to claim 1, wherein for the Kth firmware update file of the plurality of firmware update files, the algorithm is executed to determine whether $Tt_{CF}+Td_{CF}$ is less than $Tt_{OF}$, where $Tt_{CF}$ is a transmission time for transmitting the compressed Kth firmware update file to the terminal device, $Td_{CF}$ is a decompression time of the compressed Kth firmware update file, and $Tt_{OF}$ is a transmission time for transmitting the original Kth firmware update file to the terminal device.

3. The firmware updating method according to claim 2, wherein in response to $Tt_{CF}+Td_{CF}$ being determined to be less than $Tt_{OF}$, the host is configured to determine that the Kth firmware update file needs to be compressed, and in response to $Tt_{CF}+Td_{CF}$ being determined not to be less than $Tt_{OF}$, the host is configured to determine that the Kth firmware update file does not need to be compressed.

4. The firmware updating method according to claim 3, wherein $(Td_{CF})=(Size_{CF}/Ds)$, where $Size_{CF}$ is a file size of the compressed Kth firmware update file, Ds is a decompression speed of the terminal device, and the decompression speed is determined according to a computing capability of a processor and a size of a memory of the terminal device.

5. The firmware updating method according to claim 4, wherein the decompression speed of the terminal device is further determined according to a dictionary size of the compression algorithm, and the dictionary size is determined according to the size of the memory of the terminal device.

6. The firmware updating method according to claim 4, further comprising:
   during a system initialization of the terminal device, the terminal device is configured to collect at least one space from the memory by a buffer collector, and after the system initialization is completed, the at least one space is used as a buffer for decompression.

7. The firmware updating method according to claim 6, wherein a preset size is determined according to the compression algorithm, and in response to the at least one space collected from the memory by the buffer collector satisfying the preset size, the buffer collector stops collecting the at least one space from the memory.

8. The firmware updating method according to claim 7, wherein the buffer collector collecting the at least one space from the memory refers to collecting a memory address and a size of the memory.

9. The firmware updating method according to claim 7, further comprising:
   in response to the plurality of firmware update files being received by the terminal device, the terminal device is configured to write the data in the memory into a non-volatile memory through a system suspender, and then terminate executions of other tasks of the terminal device until the terminal device uses the plurality of firmware update files to update the firmware, the system suspender then resumes the executions of the other tasks.

10. A firmware updating system, comprising:
    a terminal device; and
    a host configured to store a plurality of firmware update files used for updating a plurality of firmwares of the terminal device, wherein K is a positive integer, and the host is configured to individually transmit the plurality of firmware update files to the terminal device and determine whether or not a Kth firmware update file of the plurality of firmware update files needs to be compressed by executing an algorithm before the Kth firmware update file is transmitted, in response to determining that the Kth firmware update file needs to be compressed, the host is configured to compress the Kth firmware update file by executing a compression algorithm, and in response to determining that the Kth firmware update file does not need to be compressed, the host is configured to transmit the original Kth firmware update file to the terminal device;

wherein the host and the terminal device each at least comprise a processor;

wherein the terminal device is configured to, for the compressed Kth firmware update file, decompress the compressed Kth firmware update file by using the compression algorithm, and update a corresponding one of the plurality of firmwares by using the decompressed Kth firmware update file, and the terminal device is configured to, for the original Kth firmware update file, use the original Kth firmware update file to update the corresponding one of the plurality of firmwares.

11. The firmware updating system according to claim 10, wherein for the Kth firmware update file of the plurality of firmware update files, the algorithm is executed to determine whether $Tt_{CF}+Td_{CF}$ is less than $Tt_{OF}$, where $Tt_{CF}$ is a transmission time for transmitting the compressed Kth firmware update file to the terminal device, $Td_{CF}$ is a decompression time of the compressed Kth firmware update file, and $Tt_{OF}$ is a transmission time for transmitting the original Kth firmware update file to the terminal device.

12. The firmware updating system according to claim 11, wherein in response to $Tt_{CF}+Td_{CF}$ being determined to be less than $Tt_{OF}$, the host is configured to determine that the Kth firmware update file needs to be compressed, and in response to $Tt_{CF}+Td_{CF}$ being determined not to be less than $Tt_{OF}$, the host is configured to determine that the Kth firmware update file does not need to be compressed.

13. The firmware updating system according to claim 12, wherein $Td_{CF}=(Size_{CF}/Ds)$, where $Size_{CF}$ is a file size of the compressed Kth firmware update file, Ds is a decompression speed of the terminal device, and the decompression speed is determined according to a computing capability of the processor and a size of a memory of the terminal device.

14. The firmware updating system according to claim 13, wherein the decompression speed of the terminal device is further determined according to a dictionary size of the compression algorithm, and the dictionary size is determined according to the size of the memory of the terminal device.

15. The firmware updating system according to claim 13, wherein during a system initialization of the terminal device, the terminal device is configured to collect at least one space from the memory by a buffer collector, and after the system initialization is completed, the at least one space is used as a temporary storage area for decompression.

16. The firmware updating system according to claim 15, wherein a preset size is determined according to the compression algorithm, and in response to the at least one space collected from the memory by the buffer collector satisfying the preset size, the buffer collector stops collecting the at least one space from the memory.

17. The firmware updating system according to claim 16, wherein the buffer collector collecting the at least one space from the memory refers to collecting memory addresses and sizes of the memory.

18. The firmware updating system according to claim 16, wherein in response to the plurality of firmware update files being received by the terminal device, the terminal device is configured to write the data in the memory into a non-volatile memory through a system suspender, and then terminate executions of other tasks of the terminal device until the terminal device uses the plurality of firmware update files to update the firmware, the system suspender then resumes the executions of the other tasks.

* * * * *